(12) United States Patent
Rittner et al.

(10) Patent No.: US 8,616,516 B2
(45) Date of Patent: Dec. 31, 2013

(54) ASSEMBLING DEVICE FOR CABIN INTERIOR COMPONENTS

(75) Inventors: Wolfgang Rittner, Ahrensbok (DE); Rudiger Meckes, Berkenthin (DE); Hasso Weinmann, Luebeck (DE)

(73) Assignee: Intertechnique S.A. (FR)

( * ) Notice: Subject to any disclaimer, the term of this patent is extended or adjusted under 35 U.S.C. 154(b) by 106 days.

(21) Appl. No.: 13/053,979

(22) Filed: Mar. 22, 2011

(65) Prior Publication Data

US 2011/0233359 A1    Sep. 29, 2011

Related U.S. Application Data

(60) Provisional application No. 61/316,908, filed on Mar. 24, 2010.

(51) Int. Cl.
*A47B 97/00* (2006.01)
(52) U.S. Cl.
USPC .............................. 248/500; 248/510; 24/453

(58) Field of Classification Search
USPC ............. 248/500, 510; 24/453, 297; 411/508, 411/913
See application file for complete search history.

(56) References Cited

U.S. PATENT DOCUMENTS

| | | | | |
|---|---|---|---|---|
| 2,451,591 | A * | 10/1948 | Tinnerman et al. | 411/508 |
| 5,036,567 | A * | 8/1991 | Clinch | 24/453 |
| 7,155,840 | B1 * | 1/2007 | Carbonaro | 33/613 |
| 7,725,991 | B2 * | 6/2010 | Lubera et al. | 24/295 |
| 2003/0209632 | A1 | 11/2003 | Hessling | |
| 2011/0097137 | A1 | 4/2011 | Spitz | |

FOREIGN PATENT DOCUMENTS

| | | |
|---|---|---|
| DE | 19607786 | 9/1997 |
| DE | 10220808 | 12/2003 |
| DE | 102007042484 | 1/2009 |
| DE | 102007060953 | 6/2009 |

* cited by examiner

*Primary Examiner* — Amy J Sterling
(74) *Attorney, Agent, or Firm* — Dean W. Russell; Kilpatrick Townsend & Stockton LLP

(57) ABSTRACT

Embodiments of the present invention provide a mounting bracket for use in connection with a rail, for assembling cabin interior components into an aircraft.

18 Claims, 3 Drawing Sheets

ASSEMBLING DEVICE FOR CABIN INTERIOR COMPONENTS

This application claims the benefit of U.S. Provisional Application Ser. No. 61/316,908, filed Mar. 24, 2010 titled "Assembling Device for Cabin Interior Components," the entire contents of which are hereby incorporated by reference.

FIELD OF THE INVENTION

Embodiments of the present invention generally relate to devices and methods for mounting aircraft cabin interior components. Specific embodiments provide brackets that are specially designed for mounting and release of such components.

BACKGROUND

A general problem associated with aircraft cabin interiors is the need to fit individual components into the cabin system in a flexible but safe manner. Airlines tend to demand increasingly individual equipment to differentiate their cabin interiors from other airlines, and thus, aircraft manufacturers have to follow such demand.

However, any assembling devices for cabin interiors used in aircraft must provide a reliable fixation of the cabin interior component for which it is used, i.e., a fixation resistant against high forces acting on the assembling device in the course of high accelerations occurring in an aircraft during flight, vibration, and other impacting loads. In particular, it is required that such assembling devices are able to withstand the high loads that might occur in an aircraft accident to safely prevent cabin interior components from being released or from otherwise moving in the event of such accidents. It is further desirable to provide an assembling device that is able to compensate misalignments due to manufacturing tolerances and to allow for easy and fast assembling and disassembling of the cabin interior component. Finally, in many applications, it is desirable to provide an assembling device that allows for easy access to the assembled component for maintenance purposes.

Embodiments of the present invention thus provide an assembling device and system that overcomes the drawbacks of existing assembling devices for cabin interior components of an aircraft.

BRIEF SUMMARY

Embodiments of the present invention provide an assembling system, and specifically, a mounting bracket for use in connection with a rail, for assembling cabin interior components into an aircraft. One embodiment of the system provides a rail with interior rail space having an opening slot into which a bracket having a mounting part may be positioned. A particular embodiment of the bracket includes a first leg integrally connected to and moveable relative to a second leg, with an elastic region therebetween. The relative and elastic movement of the first leg in relation to the second leg is provided by the elastic region of the bracket, and the two legs are biased in relation to each other to allow clipping the bracket into the rail in order to establish a form-locking coupling of the bracket and the rail. The assembling devices described herein further generally provide a disassembling part connected to the second leg, the disassembling part having a face arranged to exert a force onto the second leg acting against the biasing force and moving the second leg into the first position.

DETAILED DESCRIPTION

Figure 1:
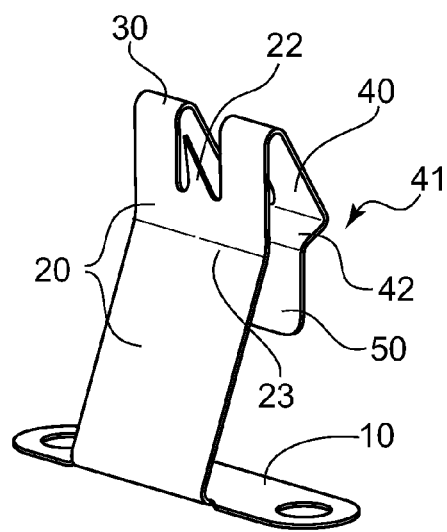
FIG. 1 is a perspective view of a bracket according to one embodiment of the invention.
Figure 2:
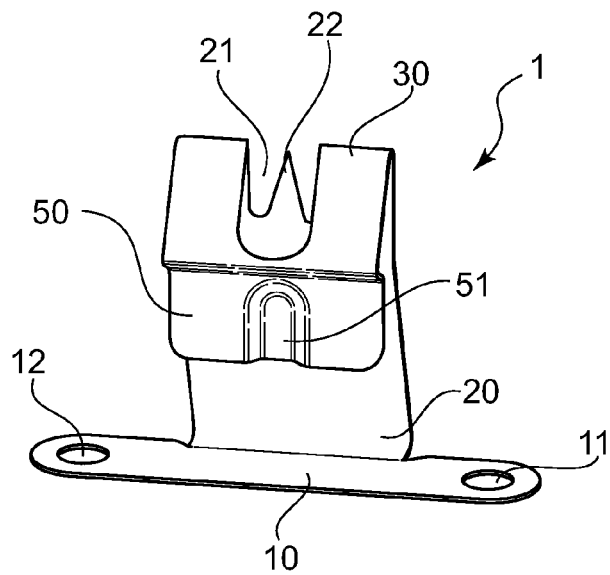
FIG. 2 is a perspective rear side view of the bracket of FIG. 1.
Figure 3:
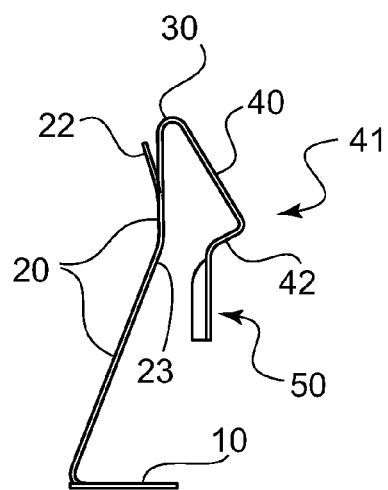
FIG. 3 is a cross-sectional view of the bracket of FIG. 1.
Figure 4:
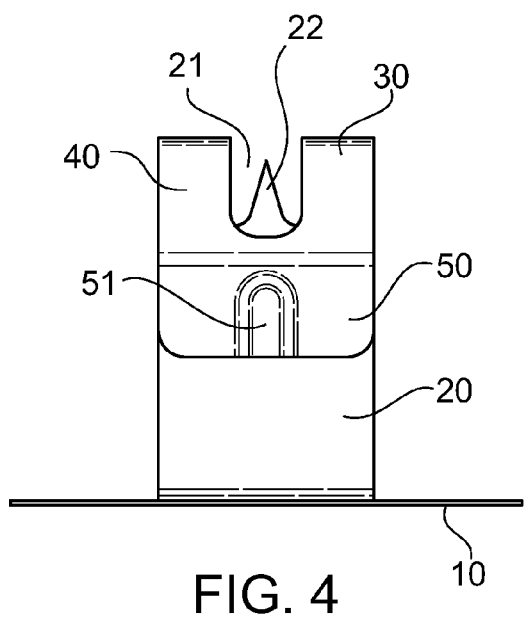
FIG. 4 is a rear plan view of the bracket of FIG. 1.

The assembling devices described herein generally provide for an easy assembling and disassembling procedure for cabin interior components. In use, a rail fixed to an aircraft cooperates with a bracket fixed to a cabin interior component (which may be an emergency oxygen supply, a passenger entertainment unit, or any other component that is desirably attached to a cabin interior). The bracket generally has a first leg and a second leg which are elastically movable to each other and are adapted to be clipped into a recess of the rail thus establishing a form locking coupling, i.e., a mechanical connection preventing removal of the bracket from the rail by a direct force transmission independent from frictional forces. This makes it possible to mount the bracket with a single action which can be exerted by one hand by a user to the rail thus significantly facilitating the mounting process.

Disassembling and removing the component is further facilitated. A disassembling part is provided, which allows a force exerted on the second leg to move the second leg in relation to the first leg and thus to release the form locking coupling and remove the bracket from the rail. The face provided at the disassembling part connected to the second leg may be adapted to allow the exertion of a force by the hand of a user or by a tool such as a screw driver inserted into a hole or recess of the cabin interior component for such purpose.

Referring now to the figures, FIGS. 1-4 show a bracket 1 according to one embodiment of that the invention. Bracket 1 comprises a mounting part 10 having two openings 11, 12 for mounting a cabin interior component via elastic clips or via screws or bolts or the like to the bracket. In the embodiment shown, the mounting part 10 is formed as a rectangular flange, although it should be understood that any number of appropriate shapes and configurations are possible for mounting part 10. A first leg 20 is connected to mounting part 10 via a curved bending angle that is typically more than about 90°.

The first leg 20 extends to an elastic region 30 between the first leg 20 and a second leg 40. The elastic region 30 is configured as an angled region and provides for a curvature between about 90 and about 180°, in particular approximately about 160° and thus allows an elastic movement of the first leg 20 in relation to the second leg 40.

In the region of the elastic region curvature 30 and the first leg 20 and the second leg 40, adjacent to the curvature 30, a recess 21 is provided in the middle part of the curvature 30 and the first and second legs 20, 40. A sharp tooth 22 extends into recess 21 on the side of the first leg 20. This sharp tooth 22 is integrally formed from the first leg 20 and is bent slightly outwards in relation to the first leg 20. By this, the sharp tooth 22 forms a scratch edge which is able to engage a rail into which the first leg 20 and the second leg 40 are inserted and to prevent sliding of the bracket along the rail.

The first leg 20 is bent at a small angle in a region 23 below the sharp tooth 22 in relation to the angled region curvature 30. On the opposite side of this small angled region 23 of the first leg 20, the second leg 40 is provided with a form locking contour 41 establishing a form locking surface 42 which is approximately tangential to the radius of relative movement of the second leg 40 provided by the elastic region 30.

The first leg 20 is connected to the second leg 40 via elastic part 30, and the elastic part provides a biasing force and forms a conical introducing portion at one end of the bracket for introducing the first and second leg into a rail (described in more detail below). This embodiment allows for an easy introduction of the bracket into the rail since such a conical elastic part may provide a self-centering and self-positioning of the bracket in relation to the rail if it is introduced into the rail. The elastic part may be formed like a flat spring or an elastic integral hinge. Further, this bracket design helps compensate for manufacturing tolerances and/or assembling tolerances within the cabin interior, without deteriorating the safety and reliability of the connection of the bracket and the rail.

A disassembling part 50 is further integrally formed at the end of the form locking part of the second leg 40. This disassembling part 50 includes a middle part which is formed as a recess 51 in relation to the surrounding region of the disassembling part to allow centering of a tool and to a form locking action between a tool and the disassembling part 50. The disassembling part 50 may protrude from the second leg in the direction of the mounting part and may comprise a recess for positioning a tool. By this, the disassembling part can easily be accessed with a finger or a tool from the direction where the cabin interior component is usually arranged which is preferable for a number of mounting arrangements of cabin interior components within an aircraft.

The mounting part 10, the first leg 20, the sharp tooth 22, the second leg 40, the form locking contour 41, and the disassembling part 50 may be integrally formed from a single metal sheet or a single plastic material. This makes it possible to manufacture the bracket 1 in a stamping and bending process or in an injection molding process. More specifically, the bracket may be formed from a single metal sheet by stamping and bending or formed from a plastic material by injection molding. These two alternative manufacturing methods are specifically well-suited to produce a bracket having elastic properties on the one hand but sufficient strength to carry the loads and stresses exerted onto such brackets in use in the fixation of cabin interior components of an aircraft. Still further, both methods are particularly well-suited to establish a frictional contact area or a scratch edge preventing sliding of the bracket along the rail in the mounted state.

Figure 5:
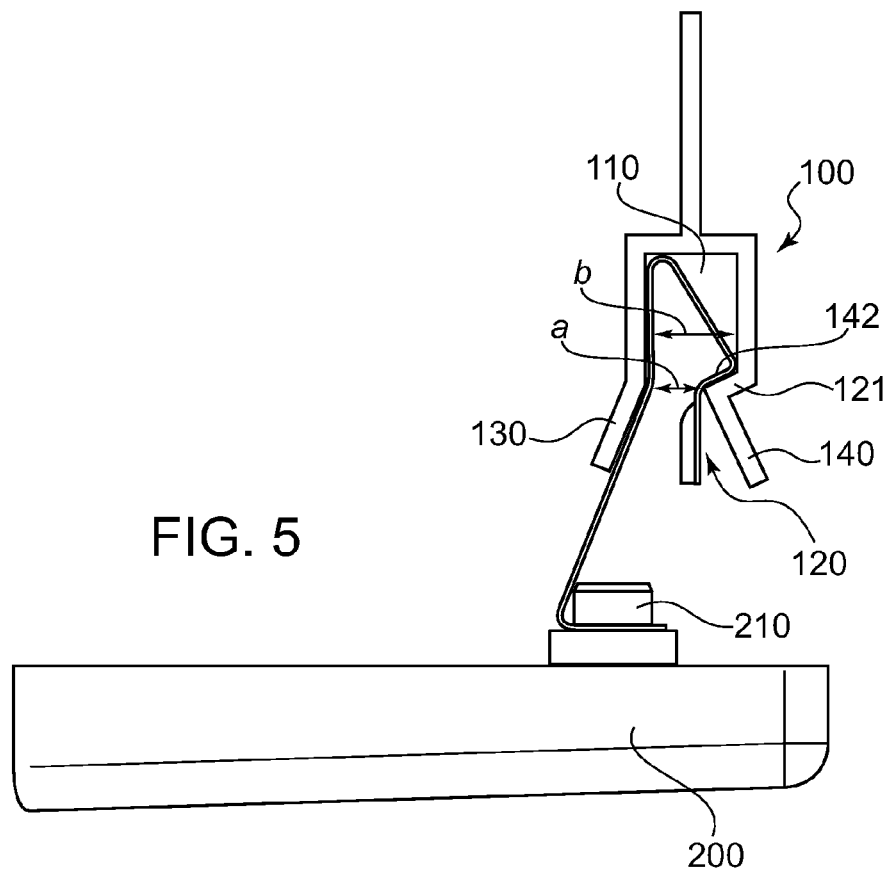
FIG. 5 is a cross-sectional view showing a cabin interior component mounted to a bracket and fixed to a rail.

FIG. 5 shows the bracket mounted to a rail 100 of a cabin interior system. As can be seen from FIG. 5, the rail 100 comprises an interior rail space 110 having an opening slot 120 which has a smaller dimension "a" than a corresponding dimension "b" of the interior rail space. By this, a form locking part 121 is established at the rail which is able to interact and engage with the form locking part 142 of the second leg of the bracket. Such engagement is shown in FIG. 5.

Still further, the rail 100 comprises an introductory portion established by two rail faces 130, 140 converging into the region of the rail slot 120. This facilitates introduction of the bracket into the rail in the assembling step. A cabin interior component 200 is mounted to the mounting part 10 of the bracket by screws 210 which are screwed through the openings 11, 12 in the mounting part 10.

Figure 6:
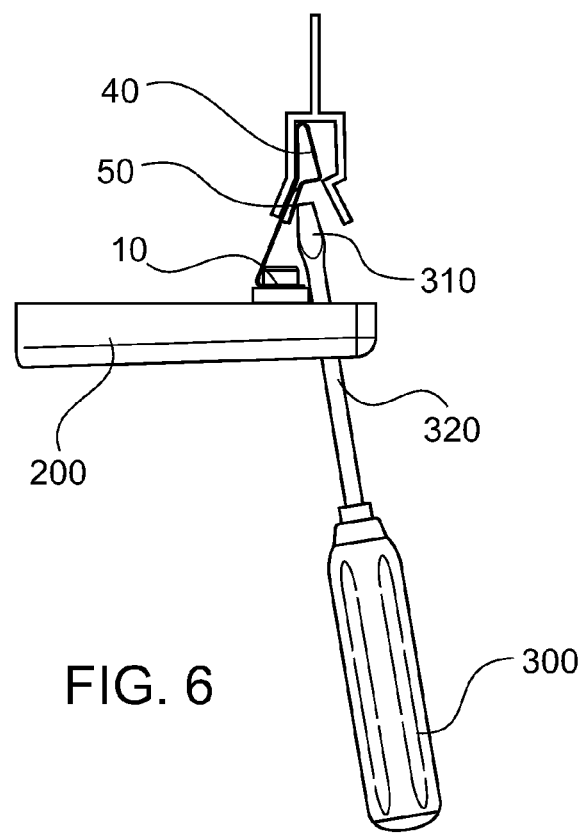
FIG. 6 is the view of FIG. 5, showing the disassembling step using a tool.

FIG. 6 shows the disassembling step of the assembling device according to the invention. As can be seen from this Figure, a tool such as a screw driver 300 is inserted through an opening provided in the cabin interior component 200 and is brought into engagement with the disassembling part 50 formed at the second leg 40. A force acting against the elastic biasing force between the first and second leg can be exerted onto the second leg 40 wherein the tip 310 of the screw driver exerts the force onto the disassembling part 50 and the shaft 320 of the screw driver is supported in the opening of the cabin interior component, thus acting against the mounting part 10 of the bracket. By exerting such disassembling force onto the disassembling part, the second leg 40 can be bent in the direction of the first leg for such a distance that the form locking engagement between the form locking part 41 of the second leg and the form locking face 121 of the rail is released and the bracket can be removed out of the rail.

The assembling device may have a first frictional contact area at the first leg and/or a second frictional at the second leg, wherein the frictional contact area(s) is/are in frictional contact to the rail, when the bracket is clipped into the rail, the frictional contact preventing a relative movement of the bracket in relation to the rail in the longitudinal direction. Generally, the assembling device should be able to follow some limited relative misalignment or movement between the rail and the cabin interior component to compensate for manufacturing tolerances and external impacts. In particular, it is desirable that the bracket shall be able to be fixed to the rail at any position along the longitudinal extension of the rail to allow a flexible mounting of different cabin interior components along the rail.

For example, a typical cabin interior component which is to be mounted by such bracket to the rail is an emergency oxygen supply system or a passenger entertainment unit or the like. However, after assembling the cabin interior component, the assembling device not only provides for a fixation preventing the unintended disassembling of the component, but it further prevents relative movement of the component along the rail. This function is provided by a frictional engagement between the bracket and the rail, whereas the frictional engagement can be provided by either the first or the second leg and the rail or both legs.

It should be understood that for achieving such function, a specific frictional surface may be provided at the bracket. One example of such a frictional surface may be a roughened surface or a specifically coated surface to establish the desired frictional contact, ensuring that a movement of the bracket along the rail is prevented. Thus, the frictional contact area may have another surface configuration than other areas of the bracket, and in particular, may have a higher roughness or may be coated with a specific material establishing such frictional contact to the rail. Alternatively, or additionally, the corresponding contact areas of the rail may be adapted to provide such frictional engagement in a sufficient extent.

Further embodiments provide at least one scratch edge at the first leg and/or at the second leg, wherein the scratch edge(s) is/are engaging the rail, when the bracket is clipped into the rail. This engagement prevents relative movement of the bracket in relation to the rail in a longitudinal direction. It should be understood that this embodiment may be provided as an alternative or an additional measure to the above-described embodiments having a frictional contact. A scratch edge is particularly useful to safely prevent relative movement of the bracket along the rail, but at the same time allow reliable and efficient manufacturing of the bracket.

In essence, a microscopic form locking engagement is provided by such a scratch edge being slightly indented into a rail. Further, such a construction is particularly useful because a scratch edge may be manufactured by stamping, embossing or the like, in particular if the bracket is made from metal sheet, and can thus be provided without additional manufacturing steps in a reliable way. Generally, it should be understood that both the frictional engagement and the engagement of a scratch edge could be established by respective contact areas of the bracket and the rail which are engaging if the bracket is in the assembled position in the rail but which can be released from each other by exerting a force onto the disassembling part of the bracket. By this, it is possible to slide the bracket along the rail if a certain first force is exerted onto the disassembling part wherein the first force is smaller than a second force required to disassemble the bracket from the rail completely. This allows for a fast and easy alignment of cabin interior components in the direction of the rail. In a specific embodiment, the scratch edge is adapted to engage the rail in such a way that a movement of the bracket in both longitudinal directions of the rail is prevented. Alternatively, two or more scratch edges may be provided, wherein a first scratch edge provides for a form locking effect in a first longitudinal direction and a second scratch edge provides for a form-locking effect in a second opposite direction to the first longitudinal direction.

In particular, the scratch edge may be provided by a lug or plate provided in a recess of the first and/or the second leg. This allows for a stamping and bending process to establish the scratch edge and thus provides for an efficient manufacturing process of the bracket. Still further, such a scratch edge may not be prone to induce injuries of the user or to affect any other surfaces of the cabin interior component in the course of the assembling or disassembling process.

A further embodiment provides a rail that has a lower hardness than the scratch edge of the bracket, in particular, lower than the whole bracket. By this, an enhanced form locking engagement may be achieved between the bracket and the rail, the form-locking engagement securing the bracket against any movement along the rail, i.e., in the longitudinal direction of the rail. This form-locking effect is achieved in that the scratch edge can dig itself at least partially into the rail. This renders it possible to safely keep the bracket in a predetermined position along the rail even if high longitudinal forces act on the cabin interior component fixed by the bracket to the rail (e.g., in case of an accident of the aircraft).

A further aspect of the invention is a bracket having a mounting part integrally connected to a first leg, a second leg integrally connected to the first leg and being relatively moveable from a first position to a second position, wherein in the first position a mounting region of the first leg is in a smaller distance to a mounting region of the second leg than in the second position, wherein the elastic movement of the first leg in relation to the second leg is provided by an elastic part of the bracket and the two legs are biased into the second position in relation to each other to allow clipping the bracket into a rail and establishing a form-locking coupling of the bracket to the rail, wherein a disassembling part connected to the second leg, the disassembling part having a face arranged to exert a force onto the second leg acting against the biasing force and moving the first and second leg into the first direction.

According to a further embodiment, the mounting part may be coupled to the first leg via a hinge defining a rotational axis, the axis extending preferably in the longitudinal direction. Such a hinge allows for two important functions of the assembling device according to the invention. First, any tolerances can easily be leveled out by such hinge and thus it is prevented that the connection between the bracket and the rail is unintentionally released by forces exerted following such manufacturing tolerances or a combination of such tolerances and vibrational forces occurring in flight. The hinge may have a single axis or maybe a multiple axis hinge to provide for this function. Secondly, such a hinge may allow rotation of the cabin interior component without removing the hinged bracket from the rail. This will allow access to a rear surface of the cabin interior component, e.g., for maintenance purposes or the like. Thus, such a hinged bracket may be used in combination with a fixation of the cabin interior components via two parallel rails and respective brackets wherein the cabin interior component is fixed to one rail via such hinged bracket and to the other rail via a non-hinged bracket, wherein only the non-hinged bracket must be released to allow maintenance of the cabin interior component.

Figure 7:
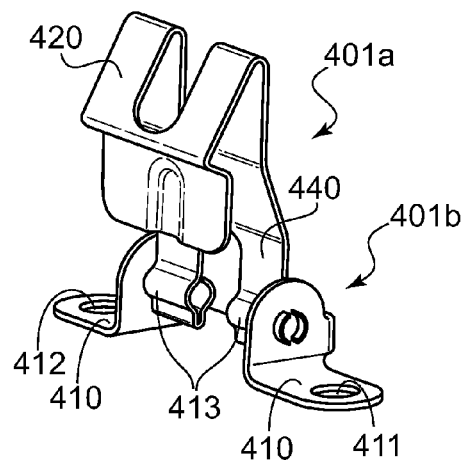
FIG. 7 is a perspective rear side view of an alternate embodiment of a bracket according to one embodiment of the invention.

FIG. 7 shows one illustration of this second embodiment of a bracket. Generally, it should be understood that the upper part 401a of this second embodiment of the bracket is generally formed in the same way as the upper part of the bracket according to the first embodiment, i.e., the bracket according to the second embodiment has a first 420 and second leg 440 with a bent, elastic portion coupling these two legs, a central recess with an outwardly bent tooth and a disassembling part extending from the second leg.

In contrast to the first embodiment, in the lower part 401b, the second leg of the second embodiment is not integrally connected to the mounting part. Instead, a hinge 413 is provided connecting the second leg 440 to the mounting part 410. The hinge 413 defines an axis which is generally perpendicular to the axis through the openings 411, 412 of the mounting part 410 and which extends along the extension of the form locking part of the second leg, and thus correspondingly to the extension of a rail to which the second embodiment of the bracket can be mounted.

Figure 8:
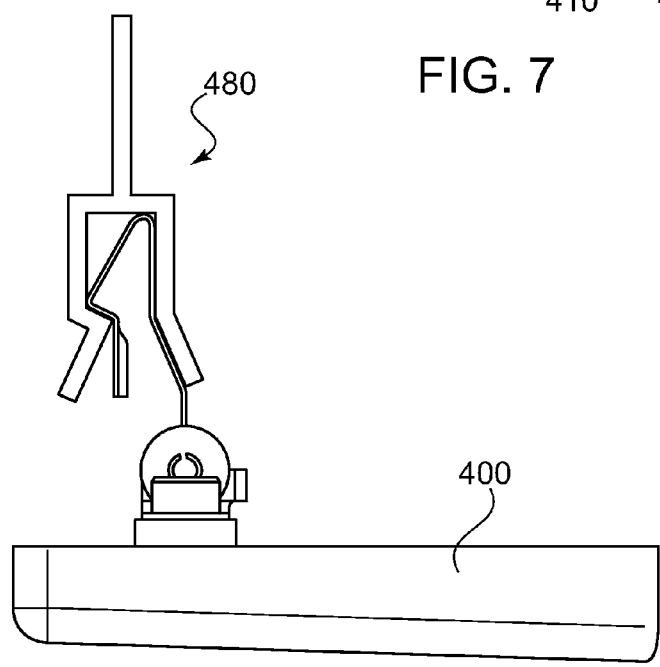
FIG. 8 is a cross-sectional view of the bracket of FIG. 7, showing the cabin interior component in a first position.

FIG. 8 shows the bracket according to the second embodiment in a mounted state. As shown, the assembly and the form locking function of the upper part of the bracket within the rail is similar to the bracket according to the first embodiment. The cabin interior component 400, however, now is mounted to the rail 480 via the hinge 413 and thus can be rotated along the axis defined by the hinge.

Figure 9:
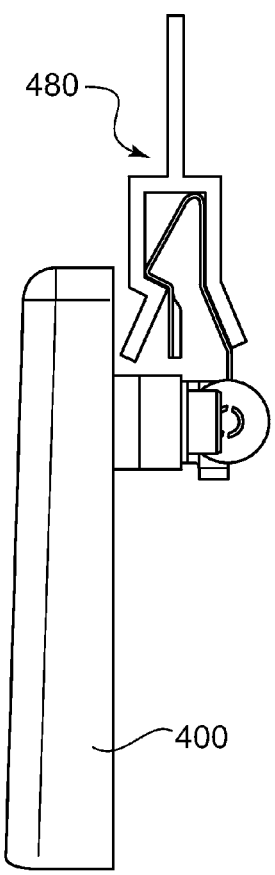
FIG. 9 is a cross-sectional view of the bracket of FIG. 7, showing the cabin interior component in a second position.

FIG. 9 shows the cabin interior component 400 in a rotated state, wherein maintenance of the cabin interior component is possible. As can be seen, the cabin interior component 400 may be rotated by 90°. It should be understood that such rotational movement can either be used for maintenance purposes, but may also be helpful in the course of assembling or disassembling the cabin interior component.

Various embodiments of the system comprise a rail extending in a longitudinal direction, the rail defining an interior rail space having an opening slot extending in the longitudinal direction and giving access to the interior rail space, wherein the opening slot has a dimension in an oblique direction perpendicular to the longitudinal direction, which is smaller than a dimension of the interior rail space in the oblique direction, and a bracket having a mounting part integrally connected to a first leg, a second leg integrally connected to the first leg and being relatively moveable from a first position, wherein a mounting region of the first leg is in a smaller distance to a mounting region of the second leg than the dimension in the oblique direction of the rail to a second position, wherein the mounting region of the first leg is in a larger distance to a mounting region of the second leg than the dimension in the oblique direction of the rail, wherein the elastic movement of the first leg in relation to the second leg is provided by an elastic part of the bracket and the two legs are biased into the second position in relation to each other to allow clipping the bracket into the rail and establishing a form-locking coupling of the bracket and the rail.

The bracket may be used to fix cabin interior components to a rail provided in a cabin interior of an aircraft. It should be understood that such a bracket may be further improved along the technical specifications and details described above and may then achieve the advantages described in relation to such design modifications as referenced above. Accordingly, changes and modifications, additions and deletions may be made to the structures and methods recited above and shown in the drawings without departing from the scope or spirit of the invention and the following claims.

What is claimed is:

1. An assembling device for assembling cabin interior components into an aircraft, comprising:
   (a) a rail extending in a longitudinal direction, the rail defining an interior rail space having an opening slot extending in the longitudinal direction and giving access to the interior rail space, wherein the opening slot has an opening dimension that is smaller than a dimension of the interior rail space, and
   (b) a bracket, comprising
      (i) a mounting part;
      (ii) the mounting part integrally connected to a first leg,
      (iii) a second leg, integrally connected to the first leg and being relatively moveable from a first position to a second position, wherein in the first position, a distance between a mounting region of the first leg and a mounting region of the second leg is compressed such that the bracket can be inserted into the opening slot of the rail, and wherein in the second position, the distance between the mounting region of the first leg and the mounting region of the second leg expands to secure the bracket within the interior rail space;
      (iv) an elastic region between the first and the second leg that provides elastic movement between the first leg and the second leg of the bracket, wherein the first and second legs are biased into the second expanded position in relation to each other to allow clipping the bracket into the rail and establishing a form-locking coupling of the bracket and the rail,
      (v) a disassembling part on the second leg, the disassembling part having a face that allows a force exerted onto the second leg to act against the biasing force and to move the first and second leg toward the first position, and
      (vi) a recess provided in the elastic region, with at least one scratch edge comprising a sharp tooth provided in the recess, wherein the at least one scratch edge contacts the rail when the bracket is clipped into the rail, the contact preventing a relative movement of the bracket in relation to the rail in the longitudinal direction, and wherein the rail has a lower hardness than the scratch edge.

2. The assembling device according to claim 1, further comprising at least a first frictional contact area at the first leg or the second leg or both, wherein the frictional contact area is in frictional contact to the rail when the bracket is clipped into the rail, the frictional contact preventing a relative movement of the bracket in relation to the rail in the longitudinal direction.

3. The assembling device according to claim 1, wherein the elastic region comprises a curvature where the first and second legs meet, and wherein the recess is provided in a middle part of the curvature.

4. The assembling device according to claim 1, wherein the mounting part is coupled to the first leg via a hinge defining a rotational axis, the axis extending in the longitudinal direction.

5. The assembling device according to claim 1, wherein the first leg is connected to the second leg via an elastic part, the elastic part providing a biasing force and forming a conical introducing portion at one end of the bracket for introducing the first and second leg into the rail.

6. The assembling device according to claim 1, wherein the bracket is formed from a single metal sheet by stamping and bending.

7. The assembling device according to claim 1, wherein the bracket is formed from a plastic material by injection molding.

8. The assembling device according to claim 1, wherein the disassembling part protrudes from the second leg in the direction of the mounting part and comprises a recess for positioning a tool.

9. A bracket comprising:
   (a) a mounting part integrally connected to a first leg,
   (b) a second leg, integrally connected to the first leg and being relatively moveable from a first position to a second position, wherein in the first position a mounting region of the first leg is in a smaller distance to a mounting region of the second leg than in the second position,
   (c) an elastic part between the first and second leg that provides elastic movement of the first leg in relation to the second leg and wherein the two legs are biased into the second position in relation to each other to allow clipping the bracket into a rail and establishing a form-locking coupling of the bracket to such rail,
   (d) a disassembling part on the second leg, the disassembling part having a face that allows a force exerted onto the second leg to act against the biasing force and to move the first and second leg into the first direction, and
   (d) a recess provided in the elastic part and at least one scratch edge comprising A sharp tooth provided in the recess, wherein the at least one scratch edge has greater hardness than the rail and engages the rail in use when the bracket is clipped into the rail, the engagement preventing a relative movement of the bracket in relation to the rail in a longitudinal direction.

10. The bracket according to claim 9, further comprising at least a first frictional contact area at the first leg or the second leg or both, wherein the frictional contact area is in frictional contact to a rail in use when the bracket is clipped into the rail, the frictional contact preventing a relative movement of the bracket in relation to the rail in a longitudinal direction.

11. The bracket according to claim 9, wherein the elastic part comprises a curvature where the first and second legs meet, and wherein the recess is provided in a middle part of the curvature.

12. The bracket according to claim 9, wherein the mounting part is coupled to the first leg via a hinge defining a rotational axis, the axis extending in a longitudinal direction.

13. The bracket according to claim 9, wherein the first leg is connected to the second leg via an elastic part, the elastic part providing a biasing force and forming a conical introducing portion at one end of the bracket for introducing the first and second leg into a rail.

14. The bracket according to claim 9, wherein the bracket is formed from a single metal sheet by stamping and bending.

15. The bracket according to claim 9, wherein the bracket is formed from a plastic material by injection molding.

16. The bracket according to claim 9, wherein the disassembling part protrudes from the second leg in the direction of the mounting part and comprises a recess for positioning a tool.

17. The assembling device according to claim 1, wherein the sharp tooth is bent outwards in the recess.

18. The bracket according to claim 9, wherein the sharp tooth is bended outwards in the recess.

* * * * *